US012598593B2

(12) United States Patent
Zhu

(10) Patent No.: US 12,598,593 B2
(45) Date of Patent: Apr. 7, 2026

(54) METHODS AND DEVICES FOR SWITCHING BETWEEN FREQUENCY DOMAIN RESOURCES, AND COMPUTER READABLE STORAGE MEDIUMS

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 421 days.

(21) Appl. No.: 18/025,182

(22) PCT Filed: Sep. 30, 2020

(86) PCT No.: PCT/CN2020/119549
§ 371 (c)(1),
(2) Date: Mar. 7, 2023

(87) PCT Pub. No.: WO2022/067725
PCT Pub. Date: Apr. 7, 2022

(65) Prior Publication Data
US 2023/0319800 A1 Oct. 5, 2023

(51) Int. Cl.
*H04W 72/0453* (2023.01)
*H04W 36/06* (2009.01)
(Continued)

(52) U.S. Cl.
CPC ....... *H04W 72/0453* (2013.01); *H04W 36/06* (2013.01); *H04W 72/12* (2013.01); *H04W 72/23* (2023.01); *H04W 72/232* (2023.01)

(58) Field of Classification Search
CPC ........... H04W 72/0453; H04W 72/232; H04W 36/06; H04W 72/12; H04W 72/23
See application file for complete search history.

(56) References Cited

U.S. PATENT DOCUMENTS

2019/0297636 A1 9/2019 Gupta et al.
2019/0313410 A1 10/2019 Yang et al.
(Continued)

FOREIGN PATENT DOCUMENTS

CN 110603834 A 12/2019
CN 110754127 A 2/2020
(Continued)

OTHER PUBLICATIONS

International Search Report of PCT/CN/2020/119549 dated Jun. 25, 2021 with English translation, (4p).
(Continued)

*Primary Examiner* — Omar J Ghowrwal
(74) *Attorney, Agent, or Firm* — Arch & Lake LLP; Hao Tan; Shen Wang

(57) ABSTRACT

The method includes: obtaining first information, which is for a terminal device to determine relevant information of switching between frequency domain resources, where the relevant information includes switching time and resource information after the switching, and the resource information after the switching includes a service beam identification after the switching and/or frequency domain resource information after the switching; and determining the relevant information of the switching between frequency domain resources according to the first information.

14 Claims, 1 Drawing Sheet

Obtain first information, where the first information is used for the terminal device to determine relevant information of switching between frequency domain resources, the relevant information includes switching time and resource information after switching, and the resource information after switching includes a service beam identification and/or frequency domain resource information after switching — S110

Determine the relevant information of switching between frequency domain resources according to the first information — S120

(51) Int. Cl.

| | |
|---|---|
| *H04W 72/12* | (2023.01) |
| *H04W 72/23* | (2023.01) |
| *H04W 72/232* | (2023.01) |

(56) References Cited

U.S. PATENT DOCUMENTS

| | | | | |
|---|---|---|---|---|
| 2020/0145079 | A1 | 5/2020 | Marinier et al. | |
| 2022/0007248 | A1* | 1/2022 | Shrestha | H04W 24/08 |
| 2022/0045732 | A1* | 2/2022 | Islam | H04W 36/06 |

FOREIGN PATENT DOCUMENTS

| | | | |
|---|---|---|---|
| CN | 111432478 | A | 7/2020 |
| CN | 111510267 | A | 8/2020 |
| IN | 110831124 | A | 2/2020 |
| WO | 2019157696 | A1 | 8/2019 |

OTHER PUBLICATIONS

First Office Action of Chinese Application No. 202080002390.X dated Nov. 18, 2022 with English translation, (12p).

Sony, "Discussions on handover in NTN", 3GPP TSG RAN WG1 Meeting #93, R1-1807243, Busan S. Korea, May 21-25, 2018, (4p).

Nokia, "On remaining details of BWPs", 3GPP TSG-RAN WG1 Meeting NR1801, R1-1800552, Vancouver, Canada, Jan. 22-26, 2018, (8p).

ISA State Intellectual Property Office of the People's Republic of China, Written Opinion of the International Searching Authority Issued in Application No. PCT/CN2020/119549, Jun. 25, 2021, WIPO, 6 pages.

Intel Corporation, "On BWP Switching" 3GPP TSG-RAN4 Meeting #87, R4-1806318, Busan, South Korea, May 21-25, 2018, (6p).

* cited by examiner

Obtain first information, where the first information is used for the terminal device to determine relevant information of switching between frequency domain resources, the relevant information includes switching time and resource information after switching, and the resource information after switching includes a service beam identification and/or frequency domain resource information after switching

S110

Determine the relevant information of switching between frequency domain resources according to the first information

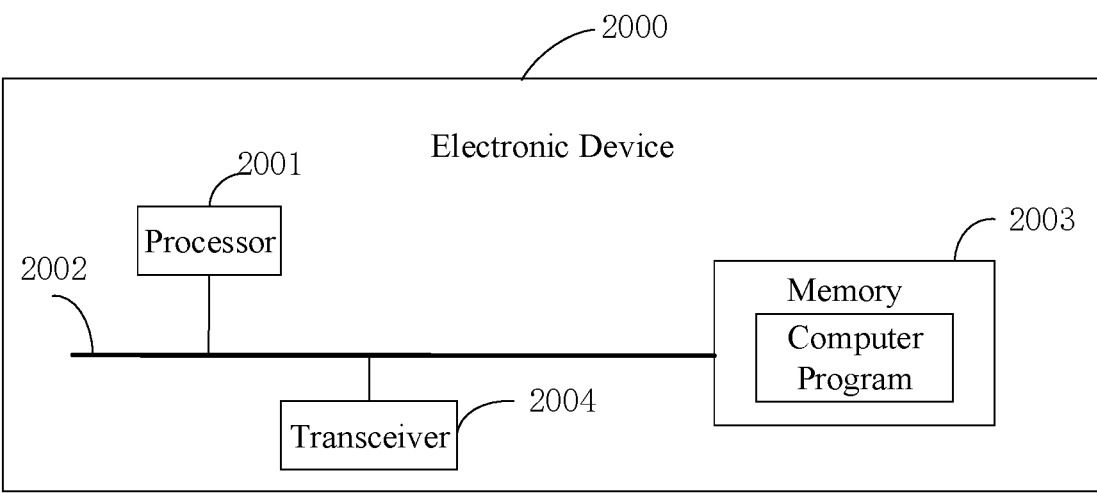

2000

Electronic Device

2001

Processor

2002

2003

Memory

Computer Program

2004

Transceiver

FIG. 2

METHODS AND DEVICES FOR SWITCHING BETWEEN FREQUENCY DOMAIN RESOURCES, AND COMPUTER READABLE STORAGE MEDIUMS

CROSS REFERENCE TO RELATED APPLICATIONS

This application is the national phase of International Application No. PCT/CN2020/119549 filed on Sep. 30, 2020, the disclosure of which is hereby incorporated by reference in its entirety.

TECHNICAL FIELD

The present disclosure relates to the field of wireless communication technologies, and in particular to methods and devices for switching between frequency domain resources, and a computer-readable storage medium.

BACKGROUND

Higher requirements are put forward on wireless communication technology as new Internet applications such as new-generation augmented reality (AR)/virtual reality (VR) and vehicle-to-vehicle communication emerged, which drives the wireless communication technology to evolve continuously to satisfy needs of applications.

At present, cellular mobile communication technology is in an evolution stage of new-generation technologies. An important feature of the new-generation technologies is to support flexible configuration of multiple service types. Different service types have different requirements on wireless communication technology, for example, an Enhanced Mobile Broadband (eMBB) service mainly requires a large bandwidth and a high speed, an Ultra Reliable Low Latency Communication (URLLC) service mainly requires high reliability and low latency, and a massive Machine Type Communication (mMTC) service mainly requires a large number of links. Therefore, new-generation wireless communication systems require a flexible and configurable design to support transmission of multiple service types.

SUMMARY

The purpose of the present disclosure is to provide methods and devices for switching between frequency domain resources, and a computer-readable storage medium that can better meet communication requirements. To achieve this purpose, the technical solutions provided by the embodiments of the present disclosure are as follows:

In an aspect, an embodiment of the present disclosure provides a communication method that can be performed by a terminal device. The method can include:

obtaining first information, which is for a terminal device to determine relevant information of switching between frequency domain resources, where the relevant information includes switching time of the switching between frequency domain resources and resource information after the switching, and the resource information after the switching includes a service beam identification after the switching and/or frequency domain resource information after the switching; and determining the relevant information of the switching between frequency domain resources according to the first information.

In another aspect, an embodiment of the present disclosure provides a communication method that can be performed by a network device. The method can include:

sending indication information of first information, where the first information is for a terminal device to determine relevant information of switching between frequency domain resources, the relevant information of the switching between frequency domain resources includes switching time of the switching between frequency domain resources and resource information after the switching, and the resource information after the switching includes a service beam identification after the switching and/or frequency domain resource information after the switching.

In yet another aspect, an embodiment of the present disclosure provides a terminal device, which includes:

a module for switching between frequency domain resources, configured to obtain first information and determine relevant information of switching between frequency domain resources according to the first information;

where the first information is for the terminal device to determine the relevant information of the switching between frequency domain resources, the relevant information includes switching time of the switching between frequency domain resources and resource information after the switching, and the resource information after the switching includes a service beam identification after the switching and/or frequency domain resource information after the switching.

In yet another aspect, an embodiment of the present disclosure provides a network device, which includes:

a communication module, configured to send indication information of first information, where the first information is for a terminal device to determine relevant information of switching between frequency domain resources, the relevant information of the switching between frequency domain resources includes switching time of the switching between frequency domain resources and resource information after the switching, and the resource information after the switching includes a service beam identification after the switching and/or frequency domain resource information after the switching.

In yet another aspect, an embodiment of the present disclosure also provides an electronic device, which includes a memory and a processor; where the memory is configured to store a computer program; the processor is configured to run the computer program stored in the memory to perform the method according to any embodiment of the present disclosure.

In yet another aspect, an embodiment of the present disclosure also provides a computer-readable storage medium in which a computer program is stored. When executed by a processor, the computer program causes the processor to perform the method according to any embodiment of the present disclosure.

BRIEF DESCRIPTION OF THE DRAWINGS

In order to explain more clearly technical solutions in embodiments of the present disclosure, accompanying drawings required for the description of the embodiments will be briefly introduced below.

FIG. 1 is a schematic flowchart illustrating a method for switching between frequency domain resources according to an embodiment of the present disclosure;

FIG. 2 is a schematic structural diagram illustrating an electronic device to which a communication method is applicable according to an embodiment of the present disclosure.

DETAILED DESCRIPTION OF THE EMBODIMENTS

The embodiments of the present disclosure will be described in detail below, examples of which are illustrated in the accompanying drawings. The same or similar elements and elements having the same or similar functions are denoted by like reference numerals throughout the descriptions. The embodiments described herein with reference to the accompanying drawings are explanatory, illustrative, and are only used to explain the present disclosure. The embodiments shall not be construed to limit the present disclosure.

Those skilled in the art can understand that, singular forms "a", "an", "said", and "the" described herein are intended to include plural forms as well, unless the context clearly indicates otherwise. It should be further understood that the terms "comprise", "include" and the like used in the description of embodiments of the present disclosure refer to the presence of features, integers, steps, operations, elements and/or components, but do not exclude the presence or addition of one or more other features, integers, steps, operations, elements, components, and/or a combination thereof. It should be understood that, when it refers to an element as being "connected" or "coupled" to another element, the element can be directly connected or coupled to another element, or intervening elements may also be present. In addition, "connected" or "coupled" used herein may include wireless connection or wireless coupling. The term "and/or" as used herein includes all or any one and all combinations of one or more of associated listed items.

Unless otherwise defined, all terms (including technical terms and scientific terms) used herein have the same meanings as commonly understood by those skilled in the art to which this disclosure belongs. The "user equipment", "terminal", or "terminal device" as used herein may include a wireless signal receiver equipment, which does not have a transmitting capability, and may also include a hardware equipment for receiving and transmitting, which is a hardware equipment capable of receiving and transmitting for two-way communication on a two-way communication link. Such equipment may include: a cellular or other communication equipment, which has a single line display or multi-line display or does not have the multi-line display; a Personal Communication Service (PCS), which can combine voice, data processing, fax and/or data communication capabilities; a Personal Digital Assistant (PDA), which may include a radio frequency receiver, a pager, Internet/Intranet access, a web browser, a notepad, a calendar and/or a Global Positioning System (GPS) receiver; a conventional laptop and/or palmtop computer or other device that has and/or includes a radio frequency receiver; or the like. The "terminal", "terminal device", and "user equipment" used herein can be portable, transportable, installed in vehicles (aviation, sea and/or land), or suitable and/or configured to locally operate, and/or operate in any other location on the earth and/or space in a distributed form. The "terminal", "terminal device", and "user equipment" used herein can also be communication terminals, internet terminals, music/video playback terminals, such as PDA, Mobile Internet Device (MID) and/or mobile phone with music/video playback functions, a smart TV, a set-top box.

In order to meet communication needs of a variety of new Internet applications, wireless communication technology has been evolving. Different application scenarios and different services have different requirements for wireless communication technology. Therefore, new-generation wireless communication systems need a flexible and configurable design to support multiple application scenarios and transmission of multiple service types.

In wireless communication systems, the transmission performance of low-frequency frequency domain resources is relatively good, and has been widely used in wireless communication technology. However, due to demands of services, low-frequency frequency domain resources can no longer meet requirements. In terms of higher frequency resources, frequency domain resources are relatively rich, which can provide higher frequency bandwidth. Deploying wireless communication systems at high frequencies is a key research direction. In new-generation communication systems, a carrier may occupy a relatively large bandwidth, such as 100 MHz (Mega Hertz). In this case, the power consumption of terminals can be saved by dividing a relatively large bandwidth of a carrier into a plurality of Bandwidth Parts (BWPs). For example, the bandwidth of a carrier is 80 MHz, which contains four BWPs, and the bandwidth of each bandwidth part is 20 MHz.

In the current design, a terminal can have a plurality of BWP configurations, but the terminal can only perform data interaction on one BWP (active BWP) at the same time, that is, only one BWP is in working state. In some cases, when the terminal needs to switch the working BWP, the terminal can be notified to switch the active BWP through Medium Access Control Control Element (MAC CE) or physical layer signaling.

In the existing BWP switching mechanism, when active BWP switching is performed through the physical layer signaling, a base station needs to indicate BWP switching in a corresponding information field in a scheduling instruction, and Downlink BWP (DL BWP) switching and Uplink BWP (UL BWP) switching are performed independently. However, in some communication scenarios, such as Non Terrestrial Network (NTN) communication scenario, in order to ensure the reliability of data transmission, a plurality of business beams will be used to provide business services in a large area. However, switching between beams is very dynamic, and there may be cases where there is no new business beam to serve for users in a certain period of time after users switch BWP. Therefore, in order to better meet the communication requirements, the existing manner of switching between frequency domain resources needs to be improved.

In view of the above problems existing in the existing wireless communication technology, an embodiment of the present disclosure provides a method for switching between frequency domain resources. Based on this method, the terminal device can determine the frequency domain resource serving for it when switching between frequency domain resources is performed. The method provided by the embodiment of the present disclosure is applicable to any communication scenario where switching between frequency domain resources exists, especially in the scenario where there are multiple service beams in a communication system. For example, in the case of multiple service beams in a satellite communication system, the terminal device can easily determine its corresponding frequency domain resource based on the solution provided by the embodiment of the present disclosure.

The solution provided by the embodiment of the present disclosure can be applied to various communication scenarios according to actual needs. In an example, the solution of the embodiment of the present disclosure can be applied to a satellite communication scenario.

In the development of 3GPP (the $3^{rd}$ Generation Partnership Project) technology, satellite communication as a complementary way of cellular communication systems has been studied a lot. 5G NR (5Gth New Radio, the $5^{th}$ generation new radio system) introduces Non-Terrestrial Networks (NTN). The NTN, i.e., 5G satellite communication network, which has characteristics of large cell radius. For medium/low orbit satellites, the cell coverage radius can range from 100-1000 kilometers, and for synchronous orbit satellites, the cell coverage radius can reach several thousand meters.

In the research of wireless communication technology, satellite communication is considered to be an important aspect of the development of wireless communication technology in the future. Satellite communication refers to the communication that radio communication equipment on the ground uses satellite as a relay. The satellite communication system consists of a satellite part and a ground part. Satellite communication has the following characteristics: the communication range is large, as long as it is within the range covered by radio waves transmitted by the satellite, communication can be carried out between any two points; not vulnerable to land disasters (high reliability). As a supplement to the current terrestrial cellular communication system, satellite communication can have the following benefits.

Extended coverage: for areas that cannot be covered by the current cellular communication system or have high coverage costs, such as oceans, deserts, remote mountainous areas, etc., the communication problem can be solved through satellite communication.

Emergency communication: under the condition that the infrastructure of cellular communication is unavailable in the extreme case of disasters such as earthquakes, satellite communication can be used to quickly establish communication links.

Provide industrial applications: for example, for the delay sensitive service with long-distance transmission, the delay of service transmission can be reduced through satellite communication.

It can be predicted that in the future wireless communication system, the satellite communication system and the terrestrial cellular communication system will gradually achieve deep integration and truly realize the intelligent connection of all things.

In the scenario of satellite communication, in order to ensure the reliability of data transmission, the satellite provides business services in a large area through multiple beams. At the same time, due to the high-speed mobility of the satellite, switching between beams is very dynamic, and there may be cases where there is no new business beam to serve users in a certain period of time after the terminal device switches BWP. The embodiment of the present disclosure provides a method for switching between frequency domain resources for the scenario in the existing communication system.

It can be understood that the method provided in the embodiment of the present disclosure can be applied to, but not limited to, satellite communication systems, and the applicable satellite communication systems can be satellite communication systems with transparent forwarding mode (transparent transmission via satellite), satellite communication systems with non-transparent forwarding mode (signal regeneration via satellite), or satellite communication systems with two-way connection mode. In the satellite communication system, network devices (such as base stations, reception points, etc.) can be deployed on satellites or on ground stations. The signal transmission between terminal devices and network devices needs to be transferred through satellites.

The technical solutions of the present disclosure and how the technical solutions of the present disclosure can solve the above technical problems will be described in detail with specific examples. The following specific embodiments can be combined with each other. The same or similar concepts or processes may not be repeated in some embodiments. The embodiments of the present disclosure will be described below in conjunction with the accompanying drawings.

FIG. 1 shows a schematic flowchart of a communication method according to an embodiment of the present disclosure. The method is performed by a terminal device, as shown in FIG. 1, the method can include the following steps.

Step S110: first information is obtained, where the first information is used for the terminal device to determine relevant information of switching between frequency domain resources, the relevant information of switching between frequency domain resources includes switching time of switching between frequency domain resources and resource information after switching, and the resource information after switching includes a service beam identification after switching and/or frequency domain resource information after switching;

Step S120: the relevant information of switching between frequency domain resources is determined according to the first information.

In the communication system, beams include uplink beams and downlink beams. The service beam identification (i.e., beam ID) in the embodiment of the present disclosure includes at least one of an uplink beam identification and a downlink beam identification. Similarly, the frequency domain resource information includes at least one of uplink frequency domain resource information and downlink frequency domain resource information. That is, the resource switching method provided in the embodiment of the present disclosure can be applied to the switching scenario of uplink frequency domain resources and also to switching scenario of downlink frequency domain resources.

Based on the first information, at least one of the service beam identification after switching and the frequency domain resource information after switching can be determined. It can be understood that the frequency domain resource information is frequency domain resource information corresponding to the service beam identification after switching.

Frequency domain resource information refers to information that can uniquely identify a frequency domain resource, and can include but not limited to the identification of the frequency domain resource. In the embodiment of the present disclosure, the frequency domain resource information corresponding to the service beam identification refers to information of a frequency domain resource in a working state that provides services for the terminal device. The resource granularity of the frequency domain resource is not limited in the embodiment of the present disclosure.

In an example, the frequency domain resource includes a bandwidth part (BWP), and the frequency domain resource information includes an identification of an active bandwidth part (BWP ID) after switching.

Based on the method according to the present disclosure, in the application scenario where switching between frequency domain resources occurs, the terminal device can determine the switching time, as well as the service beam identification and/or frequency domain resource information after the switching according to the above first information, so that the terminal device can respond to the switching time and perform switching between frequency domain resources based on the determined resource information. Based on this solution, the problem of how the terminal device determines the frequency domain resource serving for it when switching between frequency domain resources occurs can be effectively solved.

In an example, the solution provided in the embodiment of the present disclosure can be applied to a satellite communication system, and the terminal device includes the terminal device in the satellite communication system.

The way in which the terminal device obtains the first information is not limited in the embodiment of the present disclosure. The first information can be obtained in a way predefined by a protocol, or obtained according to indication information of the first information obtained from a network device. The specific name of the first information is not limited in the embodiment of the present disclosure.

It should be noted that the indication information involved in the embodiment of the present disclosure can be explicit indication information or implicit indication information. That is, the indication information can be an indication that can directly determine corresponding information, or an indication that can indirectly determine the corresponding information. For example, taking the indication information of the first information as an example, the indication information can be the first information, or other configuration or indication information that can be used for obtaining the first information.

In an embodiment of the present disclosure, two modes for implementing switching between frequency domain resources are provided. One is semi-static switching mode (which can be referred to as mode 1), and the other is dynamic switching mode (which can be referred to as mode 2). In combination with the two modes, various examples corresponding to the two modes will be described respectively.

Mode 1: Semi-Static Switching Mode

In an embodiment of the present disclosure, the first information includes a first mapping relationship, which is a corresponding relationship between time information and second information, and the second information includes service beam identifications and/or frequency domain resource information. Accordingly, the relevant information of switching between frequency domain resources is determined according to the first information, includes:

according to the first mapping relationship, the switching time of switching between frequency domain resources and the resource information after switching corresponding to the switching time are determined.

For the convenience of description, the above first mapping relationship can be referred to as pattern, through which the terminal device can know the corresponding relationship between each piece of time information and the resource information after switching corresponding to each piece of time information. For example, the corresponding relationship can be a corresponding relationship between each piece of time information and the service beam identification corresponding to each piece of time information, a corresponding relationship between each time piece of information and the frequency domain resource information corresponding to each piece of time information, or a corresponding relationship among each piece of time information, the service beam identification and the frequency domain resource information.

The above piece of time information can be either a time point or a time period, which can be physical time information (that is, absolute time information, for example, one piece of time information can be from 1 p.m. to 2 p.m.), or relative time information, such as logical time information, for example, a n-th time unit (such as frame, time slot, etc.) to a m-th time unit in a logical time structure of a communication system.

After obtaining the pattern, the terminal device can know the corresponding relationship between each piece of time information and the corresponding service beam identification and/or frequency domain resource information according to the pattern, that is, a service beam identification corresponding to a certain piece of time information and/or the frequency domain resource information corresponding to the service beam identification, so that the switching time and the resource information after switching can be determined according to the pattern.

As an example, assuming that the first mapping relationship includes the corresponding relationship between a first time period in absolute time (for example, 1 p.m. to 2 p.m.) and the service beam identification (ID) corresponding to the time period and an active BWP ID corresponding to the service beam ID, and the corresponding relationship between a second time period (for example, 2 p.m. to 3 p.m.) and the service beam ID corresponding to the time period and an active BWP ID corresponding to the service beam ID, based on the first mapping relationship, the terminal device can know the resource information corresponding to the first time period and the second time period respectively. The switching time of switching between frequency domain resources is 2 p.m., switching between frequency domain resources is performed at 2 p.m., and the communication is performed based on the service beam ID corresponding to the time period and the active BWP ID corresponding to the service beam during the time period from 2 p.m. to 3 p.m.

In an embodiment of the present disclosure, the second information can include the service beam identifications and the frequency domain resource information, that is, the first mapping relationship can be a corresponding relationship between each piece of time information and the service beam identification and the frequency domain resource information corresponding to each piece of time information.

Correspondingly, according to the first mapping relationship, determining the switching time of switching between frequency domain resources and the resource information after switching corresponding to the switching time can include:

according to the first mapping relationship, determining the switching time, and determining a service beam identification and frequency domain resource information corresponding to time information corresponding to the switching time as the resource information after switching.

In this embodiment, based on the first mapping relationship, the terminal device can directly determine the switching time, the service beam ID after switching and the frequency domain resource information corresponding to the service beam ID.

In an embodiment of the present disclosure, the second information may include the service beam identifications or the frequency domain resource information, and the method may further include:

a second mapping relationship which is a corresponding relationship between the service beam identifications and the frequency domain resource information is obtained.

According to the first mapping relationship, determining the switching time of switching between frequency domain resources and the resource information after switching corresponding to the switching time, includes:

according to the first mapping relationship, determining the switching time, and a service beam identification or frequency domain resource information corresponding to the switching time; and determining frequency domain resource information corresponding to the determined service beam identification according to the determined service beam identification and the second mapping relationship, or determining a service beam identification corresponding to the determined frequency domain resource information according to the determined frequency domain resource information and the second mapping relationship.

In other words, the first mapping relationship can be a corresponding relationship between each piece of time information and the service beam ID corresponding to each piece of time information, or a corresponding relationship between each piece of time information and the frequency domain resource information (i.e., the frequency domain resource serving the terminal device) corresponding to each piece of time information. At this time, based on the first mapping relationship, the terminal device can determine the switching time and the service beam ID after switching or the switching time and the frequency domain resource information after switching, and then further determine the frequency domain resource information or the service beam ID based on the second mapping relationship.

As another example, the first mapping relationship can also be a corresponding relationship between any two of each piece of time information, the service beam ID corresponding to each piece of time information, and the frequency domain resource information corresponding to each piece of time information. Accordingly, the second mapping relationship can be a corresponding relationship between one of the above two and the remaining one other than the above two of each piece of time information, the service beam ID corresponding to each piece of time information, and the frequency domain resource information corresponding to each piece of time information. The terminal device determines the above two according to the first mapping relationship, and determines the remaining one based on one of the determined two and the second mapping relationship.

In an embodiment of the present disclosure, obtaining the first information may include:

obtaining the first information which is predefined; or receiving indication information of the first information sent by a network device, and determining the first information according to the indication information.

Similarly, obtaining the second mapping relationship can include:

obtaining the second mapping relationship which is predefined; or receiving indication information of the second mapping relationship sent by a network device, and determining the second mapping relationship according to the indication information.

In an embodiment of the present disclosure, receiving the indication information of the first information sent by the network device can include:

receiving the indication information of the first information sent by the network device through system information, high-level signaling or physical layer signaling.

Similarly, receiving indication information of the second mapping relationship sent by the network device can include:

receiving the indication information of the second mapping relationship sent by the network device through system information, high-level signaling or physical layer signaling.

In other words, the terminal device can obtain the first information, the second mapping relationship and other information in a way pre-agreed by a protocol; or the network device can notify the terminal device through system information, high-level signaling or physical layer signaling, and the terminal device can obtain the corresponding information based on the indication information received from the network device. For example, the base station may send corresponding indication information to the terminal device through Radio Resource Control (RRC) signaling, MAC CE, etc. Similarly, the indication information may be explicit or implicit.

In an embodiment of the present disclosure, the method can further include:

in response to determining that there is no corresponding resource information according to the first information, the terminal device enters a designated mode or performs measurement of one or more candidate service beams.

In practical applications, there may be situations where there is no service beam in some coverage areas. In order to reduce the power consumption of the terminal device (or UE (User Equipment)), the behavior of the terminal device (or UE) in the case of no service beam can also be predefined. As an example, if there is no corresponding service beam for the terminal device (or UE), the terminal device (or UE) can enter the designated mode or perform measurement of one or more candidate service beams (that is, beams corresponding to one or more candidate service beam identifications) according to the current state information of the device. The designated mode can include but is not limited to the terminal device not performing the transmission of data and/or control information. For example, the terminal device may not perform one or more operations such as the detection of downlink control information, the reception of downlink data, sending of uplink data, and sending of uplink control signals. The candidate service beams refers to beams that may be used as service beams of the terminal device (or UE) in the future. The way that the terminal device determines which beams are its candidate service beams is not limited in the embodiment of the present disclosure.

In an example, based on the information of the pattern mentioned-above, the terminal device can also determine when there will be resource information that can serve for it. After that, the terminal device can resume the normal communication mode and perform communication based on the resource information serving for it, such as uplink transmission and/or downlink transmission.

In an example, the method can further include:

a candidate service beam set which includes at least one candidate service beam is obtained;

or, the one or more candidate service beams are determined according to the first information.

As an implementation, the network device can notify the terminal device of a potential service beam set, that is, a candidate service beam set in advance. When the terminal device determines that there is no frequency domain resource serving for it, the terminal device can perform measurement of the candidate service beams according to the notification of the network device. Or a next beam indicated in the information of the pattern (a service beam corresponding to the time information closest to the current time) is determined as the candidate service beam.

In an example, the terminal device can further report measurement information of the candidate service beams to the network device when performing the measurement operation of the candidate service beams, so that the network device can configure a more suitable service beam for the terminal device in the future.

Mode 2: Dynamic Switching Mode

In an embodiment of the present disclosure, the terminal device obtaining the first information may include:

receiving Downlink Control Information (DCI) sent by a network device, where the indication information of the first information is carried in the DCI.

In an example, the DCI carrying the indication information of the first information (the indication information can be the first information or implicit information that can determine the first information) can be the DCI or dedicated DCI. When the existing DCI is adopted, the indication information of the first information can be carried in one or more idle bits of the existing DCI. In the dynamic switching mode, the network device can send, timing of switching between frequency domain resources, and the service beam ID and/or frequency domain resource information after switching (such as the identification of the active BWP after switching) when the frequency domain service resource for the terminal device changes, to the terminal device through the DCI.

In an example, when the network device notifies the terminal device of the indication information of the first information through newly defined dedicated DCI, the length of the DCI can be equal to the length of any existing DCI, or it can be not equal to the length of the existing DCI.

As an implementation, DCI dedicated to the scenario of switching between frequency domain resources can be defined. In an example, the length of the dedicated DCI can be consistent with the length of the existing DCI by adding padding bit to reduce the complexity of blind detection of terminal device. For example, according to agreement by a protocol, the first information can be indicated at a fixed position (such as a fixed bit) or a configurable position of the DCI, for example, information such as DL BWP ID, UL BWP ID, uplink service beam ID, downlink service beam ID, and switching time can be indicated. After receiving the DCI sent by the network device, the terminal device can determine the above information through analysis. The terminal device performs switching between frequency domain resources based on the switching time carried in the DCI, and switches its corresponding service resource to a resource indicated by the resource information carried in the DCI. That is, the service beam ID and/or active BWP ID after switching are the beam ID and BWP ID indicated in the DCI.

In an embodiment of the present disclosure, receiving the DCI sent by the network device includes:

receiving the dedicated DCI according to identification information of the dedicated DCI.

In an embodiment, the identification information includes at least one of the following information:

a length of DCI;

a temporary identification of a wireless network;

a scrambling sequence.

As an implementation, when the network device sends the first information to the terminal device through the dedicated DCI, the terminal device needs to know how to identify the DCI used for switching between frequency domain resources. That is, the terminal device needs to know identification information that can uniquely identify the dedicated DCI. The dedicated DCI can be identified in an implicit or explicit way.

The identification information of the dedicated DCI can be identified by one item of information or by multiple items of information. The identification information can include but not be limited to one or more of the information listed above, or other information that can be used to identify DCI.

In a way, for example, the DCI dedicated to switching between frequency domain resources can be identified by different DCI lengths, that is, the length of the dedicated DCI may not be equal to the length of the existing DCI.

In another way, for example, the dedicated DCI can also be identified by defining a dedicated Radio Network Temporary Identity (RNTI) or a scrambling sequence.

The specific way in which the network device sends the DCI is not limited in the embodiment of the present disclosure. For example, the dedicated DCI can be sent in the same way as any existing DCI, or through agreement by other protocols, or through network device configuration or high-level configuration.

In an embodiment of the present disclosure, the method can further include:

configuration information of the dedicated DCI is obtained;

the dedicated DCI is received according to the configuration information.

The way in which the terminal device obtains the configuration information of the dedicated DCI is not limited in the embodiment of the present disclosure. The configuration information can be sent to the terminal device in a way predetermined by a protocol or by the network device based on agreement by a protocol.

The above configuration information includes all relevant information used by the terminal device to detect and obtain the DCI, including but not limited to the length information of the DCI, the corresponding aggregation level, detection times in predefined time, and time-frequency resource location of a Physical Downlink Control Channel (PDCCH) candidate where the DCI to be detected is located. Based on the obtained configuration information, the terminal device can perform PDCCH blind detection at the corresponding time-frequency resource location at the corresponding time to obtain the DCI.

In an example, obtaining the configuration information of the dedicated DCI can include at least one of the following:

receiving the configuration information of the dedicated DCI sent by the network device through system information, high-level signaling or physical layer signaling;

receiving the configuration information of the dedicated DCI sent by the network device at scheduled time.

As an implementation, for example, the network device can notify the configuration information for detecting the DCI dedicated to switching between the frequency domain resources on the beam used to carry the system information, or the network device can notify the terminal device to detect the configuration information of the dedicated DCI through the physical layer signaling within the predefined time (or time period) when the current service beam of the terminal device starts to provide services.

In an embodiment of the present disclosure, the DCI includes the indication information of the following information, that is, the indication information of the first information includes the indication information of the following items:

service beam identification;

frequency domain resource information; and/or switching time.

In an embodiment of the present disclosure, after determining the relevant information of switching between frequency domain resources according to the first information, the method can further include:

switching between frequency domain resources is performed according to the determined relevant information (switching time, service beam identification, frequency domain resource information, etc.); and in response to the switching, during the switching between frequency domain resources, the terminal device enters a designated mode or performs measurement of one or more candidate service beams.

Similarly, in order to reduce the power consumption of the terminal device, the terminal device can enter the designated mode during the switching time of switching between frequency domain resources. For example, the terminal device may not perform the detection of downlink control information, the reception of downlink data, sending of uplink data, and sending of uplink control signals, etc., or the terminal device may also perform measurement of one or more candidate service beams. For the candidate service beams, please refer to the previous description of the candidate service beams, which is not repeated here.

As another implementation, a method for switching frequency domain resources according to the present disclosure may include:

indication information of at least one item of information of switching time, a service beam identification and frequency domain resource information corresponding to the switching frequency domain resources, and a mapping relationship corresponding to information indicated by the indication information of the at least one item of information are obtained;

the at least one item of information is determined according to the indication information of the at least one item of information; and according to the determined at least one item of information and the mapping relationship, the corresponding switching time, other information than the at least one item of information of the switching time, the service beam identification and the frequency domain resource information corresponding to the switching frequency domain resources are determined.

For example, the network device can send the indication information of at least one of the above items of information to the terminal device through DCI, and the terminal device can obtain the above mapping relationship through a predetermined way, or the network device can notify the terminal device of the mapping relationship through system information or signaling. Based on the above indication information and the mapping relationship, the terminal device can determine the switching time of switching between frequency domain resources, the service beam identification and the frequency domain resource information after switching. For example, the network device can notify the terminal device in advance of the mapping relationship among each piece of time information, the service beam identification and the frequency domain resource information corresponding to each piece of time information, and can notify the terminal device of the switching time through DCI or other means. After obtaining the switching time, the terminal device can find time information to which the switching time belongs from the above mapping relationship. The service beam identification and frequency domain resource information corresponding to the time information are the service beam ID and frequency domain resource information after switching.

It can be understood that examples provided by the embodiments of the present disclosure can be implemented separately or in combination with each other.

In the above-mentioned embodiments, various implementations of the communication method provided by the present disclosure are described with the terminal device as an execution subject. Hereinafter, the method for switching between frequency domain resources provided by the embodiments of the present disclosure will be described with a network device as the execution subject. In an example, the network device can be a network device in a satellite communication system, such as a base station, a reception point. The base station can be a base station under any existing radio access technology (RAT) system. When applied in the satellite communication system, the base station can be a base station deployed on a ground station or a base station deployed on a satellite.

Specifically, when the communication method provided by the embodiment of the present disclosure is executed by the network device, the method includes:

indication information of first information is sent, where the first information is for a terminal device to determine relevant information of switching between frequency domain resources, the relevant information of switching between frequency domain resources includes switching time of switching between frequency domain resources and resource information after switching, and the resource information after switching includes a service beam identification after switching and/or frequency domain resource information after switching.

In an example, the first information includes a first mapping relationship, which is a corresponding relationship between time information and second information, where the second information includes service beam identifications and/or frequency domain resource information.

In an example, the second information includes the service beam identifications or the frequency domain resource information, and the method can further include:

indication information of a second mapping relationship sent, where the second mapping relationship is a corresponding relationship between the service beam identifications and the frequency domain resource information.

In an example, sending the indication information of the first information may include:

sending downlink control information (DCI), where the indication information of the first information is carried in the DCI.

In an example, the DCI is dedicated DCI.

In an example, before sending the indication information of the first information, the method further includes:

sending configuration information of the dedicated DCI.

In an example, sending the indication information of the first information may include:

sending the indication information of the first information through system information, high-level signaling or physical layer signaling.

For the detailed description of the above examples with the network device as the execution subject, please refer to the previous description of the corresponding parts of the above examples with the terminal device as the execution subject, and will not be repeated herein.

Based on the same principle as the communication method provided by the embodiments of the present disclosure, the embodiments of the present disclosure also provide a terminal device. The terminal device can include a module for switching between frequency domain resources, which is configured to obtain first information and determine relevant information of switching between frequency domain resources according to the first information. The first information is for the terminal device to determine the relevant information of switching between frequency domain resources, the relevant information of switching between frequency domain resources includes switching time of switching between frequency domain resources and resource information after switching, and the resource information after switching includes a service beam identification after switching and/or frequency domain resource information after switching.

In an example, the first information includes a first mapping relationship, which is a corresponding relationship between time information and second information, and the second information includes service beam identifications and/or frequency domain resource information; the module for switching between frequency domain resources can be configured to:

according to the first mapping relationship, determine the switching time of switching between frequency domain resources and the resource information after switching corresponding to the switching time.

In an example, the second information includes the service beam identifications and the frequency domain resource information; the module for switching between frequency domain resources can be configured to:

according to the first mapping relationship, determine the switching time, and determine a service beam identification and frequency domain resource information corresponding to time information corresponding to the switching time as the resource information after switching.

In an example, the second information includes the service beam identifications or the frequency domain resource information, and the module for switching between frequency domain resources can be configured to:

obtain a second mapping relationship, which is a corresponding relationship between the service beam identifications and the frequency domain resource information;

according to the first mapping relationship, determine the switching time, and a service beam identification or frequency domain resource information corresponding to the switching time; and determine frequency domain resource information corresponding to the determined service beam identification according to the determined service beam identification and the second mapping relationship, or determine a service beam identification corresponding to the determined frequency domain resource information according to the determined frequency domain resource information and the second mapping relationship.

In an example, when obtaining the first information, the module for switching between frequency domain resources can be configured to:

obtain the first information which is predefined; or receive indication information of the first information sent by a network device, and determine the first information according to the indication information.

In an example, when receiving the indication information of the first information sent by the network device, the module for switching between frequency domain resources can be configured to:

receive the indication information of the first information sent by the network device through system information, high-level signaling or physical layer signaling.

In an example, when obtaining the second mapping relationship, the module for switching between frequency domain resources can be configured to:

obtain the second mapping relationship which is predefined, or receive indication information of the second mapping relationship sent by a network device, and determine the second mapping relationship according to the indication information.

In an example, the module for switching between frequency domain resources can be further configured to:

in response to determining that there is no corresponding resource information according to the first information, the terminal device enters a designated mode or performs measurement of one or more candidate service beams.

In an example, when obtaining the first information, the module for switching between frequency domain resources can be configured to:

receive downlink control information (DCI) sent by a network device, where indication information of the first information is carried in the DCI; and determine the first information based on the DCI.

In an example, the DCI is dedicated DCI.

In an example, when receiving the DCI sent by the network device, the module for switching between frequency domain resources can be configured to:

receive the dedicated DCI according to identification information of the dedicated DCI.

In an example, the identification information includes at least one of the following information:

a length of DCI;

a temporary identification of a wireless network; or a scrambling sequence.

In an example, the module for switching between frequency domain resources can be further configured to:

obtain configuration information of the dedicated DCI;

receive the dedicated DCI according to the configuration information.

In an example, when obtaining the configuration information of the dedicated DCI, the module for switching between frequency domain resources can be configured to perform at least one of:

receive the configuration information of the dedicated DCI sent by the network device through system information, high-level signaling or physical layer signaling; or receive the configuration information of the dedicated DCI sent by the network device at scheduled time.

In an example, the indication information of the first information includes indication information of the following information:

service beam identification;

frequency domain resource information; and/or switching time.

In an example, the module for switching between frequency domain resources can be further configured to:

perform switching between frequency domain resources according to the determined relevant information of switching between frequency domain resources; and in response to the switching, during the switching between frequency domain resources, the terminal device enters a designated mode or performs measurement of one or more candidate service beams.

In an example, the module for switching between frequency domain resources can be further configured to:

obtain a candidate service beam set, which includes at least one candidate service beam;

or, determining the one or more candidate service beams according to the first information.

In an example, the service beam identification includes at least one of an uplink beam identification and a downlink beam identification, and the frequency domain resource information includes at least one of uplink frequency domain resource information and downlink frequency domain resource information corresponding to the service beam identification.

In an example, the frequency domain resources include bandwidth parts, and the frequency domain resource information includes an identification of an active bandwidth part after switching.

In an example, the terminal device includes a terminal device in a satellite communication system.

Based on the same principle as the communication method provided by the embodiment of the present disclosure, an embodiment of the present disclosure also provides a network device. The network device includes a communication module, which is configured to send indication information of first information, where the first information is for a terminal device to determine relevant information of switching between frequency domain resources, the relevant information of switching between frequency domain resources includes switching time of switching between frequency domain resources and resource information after switching, and the resource information after switching includes a service beam identification after switching and/or frequency domain resource information after switching.

In an example, the first information includes a first mapping relationship, which is a corresponding relationship between time information and second information, where the second information includes service beam identifications and/or frequency domain resource information.

In an example, the second information includes the service beam identifications or the frequency domain resource information, and the communication module is further configured to:

send indication information of a second mapping relationship, where the second mapping relationship is a corresponding relationship between the service beam identifications and the frequency domain resource information.

In an example, when sending the indication information of the first information, the communication module is configured to:

send downlink control information (DCI), where the indication information of the first information is carried in the DCI.

In an example, the DCI is dedicated DCI.

In an example, the communication module is further configured to send configuration information of the dedicated DCI before sending the indication information of the first information.

In an example, the communication module can be configured to send the indication information of the first information through system information, high-level signaling or physical layer signaling.

In an example, the network device includes a network device in a satellite communication system.

An embodiment of the present disclosure also provides an electronic device, which includes a memory and a processor. The memory is configured to store a computer program. The processor is configured to run the computer program to perform the method according to any embodiment of the present disclosure. Specifically, the electronic device can be a terminal device, which can realize the method for switching between frequency domain resources with a terminal device as an execution subject provided in any embodiment of the present disclosure. The electronic device can also be a network device, which can realize the method for switching between frequency domain resources with a network device as an execution subject provided in any embodiment of the present disclosure.

An embodiment of the present disclosure also provides a computer-readable storage medium in which a computer program is stored. When executed by a processor, the computer program causes the processor to perform the method according to any embodiment of the present disclosure.

As an embodiment, FIG. 2 shows a schematic structural diagram illustrating an electronic device to which the method according to an embodiment of the present disclosure is applicable. As shown in FIG. 2, the electronic device 2000 can include a processor 2001 and a memory 2003. The processor 2001 is connected with the memory 2003, such as through a bus 2002. The electronic device 2000 may also include a transceiver 2004. It should be noted that in practical applications, the transceiver 2004 is not limited to one, and the structure of the electronic device 2000 does not constitute a limitation of the embodiments of the present disclosure. The electronic device can communicate with other electronic devices through the transceiver 2004. For example, the electronic device can be a terminal device. The terminal device can communicate with a network device through the transceiver 2004. The electronic device can be a network device. The network device can communicate with a terminal device and other network elements in a wireless communication system through the transceiver 2004.

The processor 2001 can be CPU (Central Processing Unit), general purpose processor, DSP (Digital Signal Processor), ASIC (Application Specific Integrated Circuit), FPGA (Field Programmable Gate Array) or other programmable logic devices, transistor logic devices, hardware components or any combination thereof. The processor 2001 can implement or perform various exemplary logical blocks, modules and circuits described in combination with the disclosure of the present disclosure. The processor 2001 can also be a combination of realizing computing functions, for example, including one or more microprocessor combinations, DSP and microprocessor combinations, etc.

The bus 2002 may include a path to transmit information between the above components. The bus 2002 can be a PCI (Peripheral Component Interconnect) bus or an EISA (Extended Industry Standard Architecture) bus. The bus 2002 can be divided into address bus, data bus, control bus, etc.

For the convenience of representation, only one thick line is used in FIG. 2, but it does not mean that there is only one bus or one type of bus.

The memory 2003 can be ROM (Read Only Memory) or other types of static storage devices that can store static information and instructions, RAM (Random Access Memory) or other types of dynamic storage devices that can store information and instructions, or EEPROM (Electrically Erasable Programmable Read Only Memory) CD-ROM (Compact Disc Read Only Memory) or other optical storage, optical disk storage (including compact disc, laser disc, optical disk, digital universal disc, Blu-ray disc, etc.), magnetic storage media or other magnetic storage devices, or any other media that can be used to carry or store the desired program code in the form of instructions or data structure and can be accessed by computers, but not limited to this.

The memory 2003 is used to store the program code (computer program) for performing solutions of the present disclosure, and is controlled by the processor 2001 for performing. The processor 2001 is used to perform the program code stored in the memory 2003 to implement the content shown in any of the above method embodiments.

It should be understood that although steps in the flowchart of the accompanying drawings are shown in sequence as indicated by the arrow, these steps are not necessarily performed in sequence as indicated by the arrow. Unless explicitly stated herein, the execution of these steps is not strictly limited in order, and they can be executed in other order. Moreover, at least one part of the steps in the flowchart of the drawings may include multiple sub-steps or stages. These sub-steps or stages may not necessarily be executed at the same time, but may be executed at different times, and the execution order may not necessarily be sequential, but may be executed alternately or alternatively with other steps or at least a part of sub-steps or stages of other steps.

The above is only part of the implementation of the present disclosure. It should be pointed out that for those skilled in the art, several improvements and embellishments can be made without departing from the principle of present disclosure. These improvements and embellishments should also be regarded as the protection scope of the present disclosure.

According to an aspect, there is provided a method for switching between frequency domain resources, comprising: obtaining first information, which is for a terminal device to determine relevant information of switching between frequency domain resources, wherein the relevant information of the switching between frequency domain resources comprises switching time of the switching between frequency domain resources and resource information after the switching, and the resource information after the switching comprises a service beam identification after the switching and/or frequency domain resource information after the switching; and determining the relevant information of the switching between frequency domain resources according to the first information.

In some embodiments, the first information comprises a first mapping relationship which is a corresponding relationship between time information and second information, and the second information comprises service beam identifications and/or frequency domain resource information; wherein determining the relevant information of the switching between frequency domain resources according to the first information comprises: according to the first mapping relationship, determining the switching time of the switching between frequency domain resources and the resource information after the switching corresponding to the switching time.

In some embodiments, the second information comprises the service beam identifications and the frequency domain resource information; wherein according to the first mapping relationship, determining the switching time of the switching between frequency domain resources and the resource information after the switching corresponding to the switching time, comprises: according to the first mapping relationship, determining the switching time, and determining a service beam identification and frequency domain resource information corresponding to time information corresponding to the switching time as the resource information after the switching.

In some embodiments, the second information comprises the service beam identifications or the frequency domain resource information, and the method further comprises: obtaining a second mapping relationship, which is a corresponding relationship between the service beam identifications and the frequency domain resource information; wherein according to the first mapping relationship, determining the switching time of the switching between frequency domain resources and the resource information after the switching corresponding to the switching time, comprises: according to the first mapping relationship, determining the switching time, and a service beam identification or frequency domain resource information corresponding to the switching time; and determining frequency domain resource information corresponding to the determined service beam identification according to the determined service beam identification and the second mapping relationship, or determining a service beam identification corresponding to the determined frequency domain resource information according to the determined frequency domain resource information and the second mapping relationship.

In some embodiments, obtaining the first information comprises: obtaining the first information which is predefined; or receiving indication information of the first information sent by a network device, and determining the first information according to the indication information.

In some embodiments, receiving the indication information of the first information sent by the network device comprises: receiving the indication information of the first information sent by the network device through system information, high-level signaling or physical layer signaling.

In some embodiments, obtaining the second mapping relationship comprises: obtaining the second mapping relationship which is predefined; or receiving indication information of the second mapping relationship sent by a network device, and determining the second mapping relationship according to the indication information.

In some embodiments, the method further comprises: in response to determining that there is no corresponding resource information according to the first information, the terminal device entering a designated mode or performing measurement of one or more candidate service beams.

In some embodiments, obtaining the first information comprises: receiving downlink control information (DCI) sent by a network device, wherein indication information of the first information is carried in the DCI; and determining the first information based on the DCI.

In some embodiments, the DCI is dedicated DCI.

In some embodiments, receiving the DCI sent by the network device comprises: receiving the dedicated DCI according to identification information of the dedicated DCI.

In some embodiments, the identification information comprises at least one of: a length of DCI; a temporary identification of a wireless network; or a scrambling sequence.

In some embodiments, the method further comprises: obtaining configuration information of the dedicated DCI; and receiving the dedicated DCI according to the configuration information.

In some embodiments, obtaining the configuration information of the dedicated DCI comprises at least one of: receiving the configuration information of the dedicated DCI sent by the network device through system information, high-level signaling or physical layer signaling; or receiving the configuration information of the dedicated DCI sent by the network device at scheduled time.

In some embodiments, the indication information of the first information comprises indication information of following information: service beam identification; frequency domain resource information; and/or switching time.

In some embodiments, after determining the relevant information of the switching between frequency domain resources according to the first information, the method further comprises: performing switching between frequency domain resources according to the determined relevant information; and in response to the switching, during the switching between frequency domain resources, the terminal device entering a designated mode or performing measurement of one or more candidate service beams.

In some embodiments, the method further comprises: obtaining a candidate service beam set, which comprises at least one candidate service beam; or, determining the one or more candidate service beams according to the first information.

In some embodiments, the service beam identification comprises at least one of an uplink beam identification and a downlink beam identification, and the frequency domain resource information comprises at least one of uplink frequency domain resource information and downlink frequency domain resource information corresponding to the service beam identification.

In some embodiments, the frequency domain resources comprise bandwidth parts, and the frequency domain resource information comprises an identification of an active bandwidth part after the switching.

In some embodiments, the terminal device comprises a terminal device in a satellite communication system.

According to another aspect, there is provided a method for switching between frequency domain resources, performed by a network device, the method comprising: sending indication information of first information, wherein the first information is for a terminal device to determine relevant information of switching between frequency domain resources, the relevant information of the switching between frequency domain resources comprises switching time of the switching between frequency domain resources and resource information after the switching, and the resource information after the switching comprises a service beam identification after the switching and/or frequency domain resource information after the switching.

In some embodiments, the first information comprises a first mapping relationship, which is a corresponding relationship between time information and second information, wherein the second information comprises service beam identifications and/or frequency domain resource information.

In some embodiments, the second information comprises the service beam identifications or the frequency domain resource information, and the method further comprises: sending indication information of a second mapping relationship, wherein the second mapping relationship is a corresponding relationship between the service beam identifications and the frequency domain resource information.

In some embodiments, sending the indication information of the first information comprises: sending downlink control information (DCI), wherein the indication information of the first information is carried in the DCI.

In some embodiments, the DCI is dedicated DCI.

In some embodiments, before sending the indication information of the first information, the method further comprises: sending configuration information of the dedicated DCI.

In some embodiments, sending the indication information of the first information comprises: sending the indication information of the first information through system information, high-level signaling or physical layer signaling.

In some embodiments, the network device comprises a network device in a satellite communication system.

The invention claimed is:

1. A method for switching between frequency domain resources, performed by a terminal device, comprising:
  obtaining first information, which is for the terminal device to determine relevant information of switching between frequency domain resources, wherein the relevant information comprises switching time of the switching between frequency domain resources and resource information after the switching, and the resource information after the switching comprises at least one of a service beam identification after the switching or frequency domain resource information after the switching; and
  determining the relevant information of the switching between frequency domain resources according to the first information;
  wherein the first information comprises a first mapping relationship which is a corresponding relationship between multiple pieces of time information and multiple pieces of second information, each piece of time information comprises a time period, and each piece of second information comprises a service beam identification corresponding to a time period or frequency domain resource information corresponding to a time period; and
  wherein determining the relevant information of the switching between frequency domain resources according to the first information comprises:
  determining, according to the first mapping relationship, the switching time of the switching between frequency domain resources and the resource information after the switching corresponding to the switching time;
  wherein the method further comprises:
  obtaining a second mapping relationship, which is a corresponding relationship between the service beam identification and the frequency domain resource information; and
  wherein determining, according to the first mapping relationship, the switching time of the switching between frequency domain resources and the resource information after the switching corresponding to the switching time, comprises:
  determining, according to the first mapping relationship, the switching time and a service beam identification corresponding to the switching time; and determining frequency domain resource information corresponding to the determined service beam identification according to the determined service beam identification and the second mapping relationship; or determining, according to the first mapping relationship, the switching time and frequency domain resource information corresponding to the switching time; and determining a service beam identification corresponding to the determined frequency domain resource information according to the determined frequency domain resource information and the second mapping relationship.

2. The method according to claim 1, wherein obtaining the first information comprises:

obtaining the first information which is predefined; or receiving indication information of the first information sent by a network device, and determining the first information according to the indication information.

3. The method according to claim 2, wherein receiving the indication information of the first information sent by the network device comprises:

receiving the indication information of the first information sent by the network device through system information, high-level signaling or physical layer signaling.

4. The method according to claim 1, wherein obtaining the second mapping relationship comprises:

obtaining the second mapping relationship which is predefined; or receiving indication information of the second mapping relationship sent by a network device, and determining the second mapping relationship according to the indication information.

5. The method according to claim 1, further comprising:

in response to determining that there is no corresponding resource information according to the first information, entering a designated mode or performing measurement of one or more candidate service beams.

6. The method according to claim 1, wherein obtaining the first information comprises:

receiving downlink control information (DCI) sent by a network device, wherein indication information of the first information is carried in the DCI; and determining the first information based on the DCI.

7. The method according to claim 6, wherein the DCI is dedicated DCI.

8. The method according to claim 7, wherein receiving the DCI sent by the network device comprises:

receiving the dedicated DCI according to identification information of the dedicated DCI.

9. A non-transitory computer-readable storage medium storing a computer program, wherein the computer program, when executed by a processor, causes the processor to perform the method according to claim 1.

10. A method for switching between frequency domain resources, performed by a network device, comprising:

sending indication information of first information, wherein the first information is for a terminal device to determine relevant information of switching between frequency domain resources, the relevant information of the switching between frequency domain resources comprises switching time of the switching between frequency domain resources and resource information after the switching, and the resource information after the switching comprises at least one of a service beam identification after the switching or frequency domain resource information after the switching;

wherein the first information comprises a first mapping relationship, wherein the first mapping relationship is for the terminal to determine the switching time of the switching between frequency domain resources and the resource information after the switching corresponding to the switching time, the first mapping relationship is a corresponding relationship between multiple pieces of time information and multiple pieces of second information, each piece of time information comprises a time period, and each piece of second information comprises a service beam identification corresponding to a time period or frequency domain resource information corresponding to a time period;

wherein the method further comprises:

sending indication information of a second mapping relationship, wherein the second mapping relationship is a corresponding relationship between the service beam identification and the frequency domain resource information, and the second mapping relationship is for the terminal device to determine frequency domain resource information corresponding to a determined service beam identification according to the determined service beam identification and the second mapping relationship, or to determine a service beam identification corresponding to a determined frequency domain resource information according to the determined frequency domain resource information and the second mapping relationship.

11. The method according to claim 10, wherein sending the indication information of the first information comprises:

sending downlink control information (DCI), wherein the indication information of the first information is carried in the DCI.

12. An electronic device, comprising a memory and a processor;

wherein the memory is configured to store a computer program;

the processor is configured to run the computer program to perform the method according to claim 10.

13. A non-transitory computer-readable storage medium storing a computer program, wherein the computer program, when executed by a processor, causes the processor to perform the method according to claim 10.

14. An electronic device, comprising a memory and a processor;

wherein the memory is configured to store a computer program; and the processor is configured to run the computer program to perform:

obtaining first information, which is for a terminal device to determine relevant information of switching between frequency domain resources, wherein the relevant information comprises switching time of the switching between frequency domain resources and resource information after the switching, and the resource information after the switching comprises at least one of a service beam identification after the switching or frequency domain resource information after the switching; and determining the relevant information of the switching between frequency domain resources according to the first information;

wherein the first information comprises a first mapping relationship which is a corresponding relationship between multiple pieces of time information and multiple pieces of second information, each piece of time information comprises a time period, and each piece of second information comprises a service beam identification corresponding to a time period or frequency domain resource information corresponding to a time period; and wherein the processor is configured to run the computer program to perform:

determining, according to the first mapping relationship, the switching time of the switching between frequency domain resources and the resource information after the switching corresponding to the switching time;

wherein the processor is further configured to run the computer program to perform:

obtaining a second mapping relationship, which is a corresponding relationship between the service beam identification and the frequency domain resource information; and wherein in a process of determining, according to the first mapping relationship, the switching time of the switching between frequency domain resources and the resource information after the switching corresponding to the switching time, the processor is configured to run the computer program to perform:

determining, according to the first mapping relationship, the switching time and a service beam identification corresponding to the switching time; and determining frequency domain resource information corresponding to the determined service beam identification according to the determined service beam identification and the second mapping relationship; or determining, according to the first mapping relationship, the switching time and frequency domain resource information corresponding to the switching time; and determining a service beam identification corresponding to the determined frequency domain resource information according to the determined frequency domain resource information and the second mapping relationship.

* * * * *